(12) United States Patent  
Bowman

(10) Patent No.: US 7,571,802 B2
(45) Date of Patent: Aug. 11, 2009

(54) CONVEYOR BELT SKIRT ASSEMBLY

(75) Inventor: Houston R. Bowman, Sacramento, KY (US)

(73) Assignee: Martin Engineering Company, Neponset, IL (US)

( * ) Notice: Subject to any disclaimer, the term of this patent is extended or adjusted under 35 U.S.C. 154(b) by 69 days.

(21) Appl. No.: 11/828,475

(22) Filed: Jul. 26, 2007

(65) Prior Publication Data
US 2009/0026047 A1 Jan. 29, 2009

(51) Int. Cl.
B65G 21/20 (2006.01)

(52) U.S. Cl. .................................................. 198/836.1
(58) Field of Classification Search ............. 198/836.1, 198/836.3, 836.4
See application file for complete search history.

(56) References Cited

U.S. PATENT DOCUMENTS

| 3,024,893 | A | * | 3/1962 | Lambert | 198/836.1 |
| RE31,249 | E | | 5/1983 | Stahura | |
| 4,874,082 | A | | 10/1989 | Swinderman | |
| 4,989,727 | A | | 2/1991 | Gordon | |
| 5,048,669 | A | | 9/1991 | Swinderman | |
| 5,129,508 | A | * | 7/1992 | Shelstad | 198/860.3 |
| 5,154,280 | A | * | 10/1992 | Mott | 198/525 |
| 5,267,642 | A | * | 12/1993 | Gharpurey et al. | 198/836.1 |
| 5,350,053 | A | | 9/1994 | Archer | |
| 5,513,743 | A | * | 5/1996 | Brink | 198/836.1 |
| 5,816,388 | A | | 10/1998 | Bowman | |
| 5,913,404 | A | | 6/1999 | Bowman | |
| 5,927,478 | A | | 7/1999 | Archer | |
| 6,557,697 | B1 | | 5/2003 | Bowman | |
| 6,575,294 | B1 | | 6/2003 | Swinderman et al. | |
| 6,763,935 | B2 | | 7/2004 | Ostman | |
| 2002/0175050 | A1 | * | 11/2002 | Wiggins | 198/525 |

OTHER PUBLICATIONS

Snap-Loc Dust Seal System Technical Product Bulletin, Argonics, Inc., Apr. 2001.
Flexiskirt Conveyor Sealing System brochure, Arch Environmental Equipment, Inc., 2007.
Gordon At-Last-A-Seal Conveyor Sealing System website page, Arch Environmental Equipment, Inc., www.aeec.com, 2007.
Pos-A-Seal Skirtboard website page, Dust Control, Inc., www.dustcontrol.net.
EZ-Mount Skirting System website page, ASGCO Manufacturing, Inc., www.asgco.com, 2007.

* cited by examiner

Primary Examiner—Mark A Deuble
(74) Attorney, Agent, or Firm—Thompson Coburn LLP; Clyde L. Smith

(57) ABSTRACT

A conveyor belt skirt assembly adapted to be attached to a side wall of a conveyor mechanism to retain conveyed material on a conveyor belt of the conveyor mechanism. The conveyor belt skirt assembly includes a skirt having a generally vertical leg member and an inclined foot member attached to the bottom end of the leg member. A bracket including an arm and a finger pivotally attaches the skirt to the conveyor mechanism.

10 Claims, 4 Drawing Sheets

CONVEYOR BELT SKIRT ASSEMBLY

BACKGROUND

The present disclosure is directed to a conveyer belt skirt assembly for retaining conveyed material on a conveyor belt of a conveyor mechanism, and in particular to a skirt assembly including a generally L-shaped skirt.

Conveyor mechanisms include moving conveyor belts that carry and transport bulk material. Conveyor mechanisms often include conveyor belt skirt assemblies for use in attempting to contain the conveyed material on the conveyor belt and to prevent the conveyed material from spilling over the side edges of the conveyor belt. The conveyed material can apply a large force to the skirt assembly in a direction transverse to the direction of conveyor belt movement which may outwardly deflect the skirt of the skirt assembly such that the conveyed material may flow between the conveyor belt and the skirt assembly and over the side edges of the conveyor belt as spillage. During operation conveyor belts periodically mistrack to either the left or the right of their center position such that a skirt assembly may drop off the side edge of a mistracking conveyor belt whereupon the skirt assembly prevents the conveyor belt from returning to its proper center tracking position.

SUMMARY

A conveyor belt skirt assembly adapted to be attached to a side wall of a conveyor mechanism to retain conveyed material on the conveyor belt of a conveyor mechanism. The conveyor belt skirt assembly comprises a skirt adapted to be attached to the side wall of a conveyor mechanism. The skirt comprises a leg member including an upper portion having an upper end and a lower portion having a lower end. The upper portion includes a first inner wall and a first outer wall and the lower portion includes a second inner wall and a second outer wall. The skirt also includes a foot member extending between a first end and a second end. The first end of the foot member is attached to the lower end of the leg member. The foot member is disposed at an angle with respect to the lower portion of the leg member. The foot member is adapted to extend into a gap formed between the side wall of the conveyor mechanism and the conveyor belt to retain conveyed material on the conveyor belt. The conveyor belt skirt assembly also comprises a mounting mechanism including a mounting member adapted to be coupled to the upper portion of the leg member of the skirt and a bracket. The bracket includes an arm having a first end and a second end and a finger attached to the second end of the arm. The first end of the arm is adapted to be pivotally connected to the mounting member and the second end of the arm is adapted to be pivotally connected to the conveyor mechanism. The finger is adapted to be located between the second end of the arm and the conveyor mechanism such that the finger spaces the arm from the conveyor mechanism to thereby position the skirt with respect to the conveyor mechanism.

BRIEF DESCRIPTION OF THE DRAWING FIGURES

DETAILED DESCRIPTION

Figure 1:
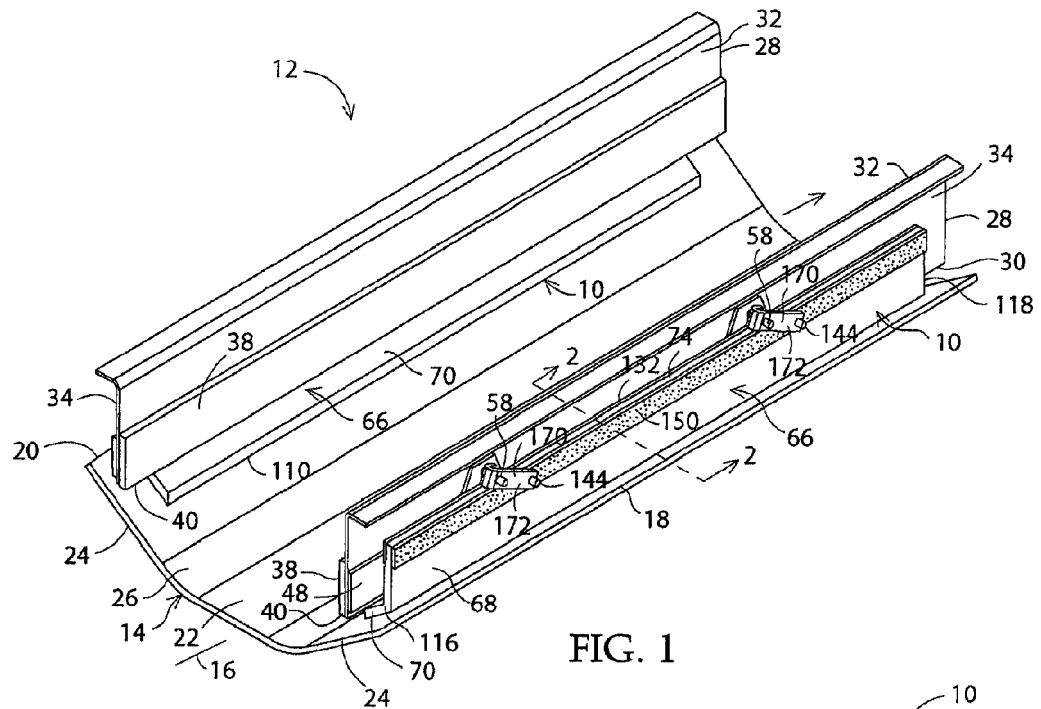
FIG. 1 is a perspective view of a conveyor mechanism including the conveyor belt skirt assembly of the present disclosure.

FIG. 1 shows two conveyor belt skirt assemblies 10 attached to a conveyor mechanism 12. The conveyor mechanism 12 includes a movable conveyor belt 14 having a central longitudinal axis 16. The conveyor belt 14 includes a generally linear first side edge 18 and a generally linear second side edge 20 that are generally parallel to one another and the central axis 16. The conveyor belt 14 may be generally trough shaped such that it includes a center section 22 and two inclined edge sections 24 that extend respectively between the center section 22 and the first and second side edges 18 and 20. The conveyor belt 14 includes a top load carrying surface 26 adapted to receive and support bulk material, such as sand, gravel, coal and like. The conveyor mechanism 12 also includes a housing including two elongate and spaced apart side walls 28. Each side wall 28 includes a bottom edge 30 that is spaced apart from and above the load carrying surface 26 of the conveyor belt 14. Each side wall 28 is located above a respective edge section 24 of the conveyor belt 14. Each side wall 28 includes a general planar interior surface 32 and a generally planar external surface 34.

The conveyor mechanism 12 may include a wear liner 38 attached to the interior surface 32 of each side wall 28. The wear liner 38 includes an elongate generally linear bottom edge 40. The bottom edge 40 of each wear liner 38 is spaced apart and above the load carrying surface 26 of the conveyor belt 14 at an inclined edge section 24. A load zone is formed above the conveyor belt 14 and between the opposing side walls 28 and wear liners 38 for the receipt of bulk material. The side walls 28 and wear liners 38 are adapted to inhibit conveyed bulk material from spilling over the edges 18 and 20 of the conveyor belt 14. The side walls 28 and wear liners 38 are usually made from metal, such that a gap is normally provided between the bottom edges 30 and 40 of the side walls 28 and wear liners 38 and the load carrying surface 26 of the conveyor belt 14 to prevent the side walls 28 and wear liners 38 from damaging the conveyor belt 14 during movement of the belt 14 with respect to the side walls 28 and wear liners 38. Bulk material may therefore pass through the gap from the load zone to the exterior of the side walls 28 and spill over the side edges 18 and 20 of the conveyor belt 14. The gap also allows for easier replacement of the belt and components such as idlers. The smaller the gap the less material that escapes but then service becomes more difficult. The gap may also trap abrasive or tramp materials and damage the belt. Therefore many operators prefer a large gap of 1-inch or more. However, the larger the gap the more the force exerted by the bulk material on the sealing system.

As shown in FIG. 1 a conveyor belt skirt assembly 10 is attached to the exterior surface 34 of each side wall 28. Each skirt assembly 10 includes a backing member 48. The backing member 48 includes an elongate generally rectangular plate member 50 having a generally linear lower edge 52 and a spaced apart and parallel linear upper edge 54. The plate member 50 includes two or more ears 56 that project upwardly from the upper edge 54. A fastener 58, such as a lynch pin, is attached to and extends outwardly from each ear 56 of the backing member 48. Each fastener 58 includes a central axis 60. Each fastener 58 includes a generally cylindrical shaft having a first end attached to the ear 56 and a second end including a diametrical bore adapted to removably receive a retainer member, such as a cotter pin or the like. The central axis 60 of each fastener 58 is generally perpendicular to the plate member 50 and side wall 28. The backing member 48 is adapted to be attached to the exterior surface 34 of the side wall 28 by welding or the like such that the lower edge 52 of the backing member 48 is generally parallel to and above the bottom edge 30 of the side wall 28. The lower edge 52 of the backing member 48 is thereby spaced apart from the load carrying surface 26 of the conveyor belt 14 and forms part of the gap with the surface 26 of the conveyor belt 14.

The conveyor belt assembly 10 also includes a skirt 66. The skirt 66 includes a generally vertical leg member 68 and an inclined foot member 70 extending outwardly from the bottom end of the leg member 68. The leg member 68 includes an upper portion 72 having an upper end 74. The upper portion 72 also includes a generally planar inner wall 76 and a generally planar outer wall 78 that is spaced apart from and generally parallel to the inner wall 76. The upper portion 72 of the leg member 68 includes two or more apertures 80, such as elongate slots, that extend between the inner and outer walls 76 and 78. The leg member 68 also includes a lower portion 84 having a lower end 86. The lower portion 84 includes a generally planar inner wall 88 and a spaced part and generally parallel planar outer wall 90. The lower portion 84 is attached to the upper portion 72. The outer wall 78 of the upper portion 72 and the outer wall 90 of the lower portion 84 are generally co-planar with one another. The inner wall 76 of the upper portion 72 and the inner wall 88 of the lower portion 84 are located generally parallel to one another. The inner wall 76 of the upper portion 72 is inwardly offset from the inner wall 88 of the lower portion 84 thereby forming a pocket. The thickness of the lower portion 84 between the inner and outer walls 88 and 90 is greater than the thickness of the upper portion 72 between the inner and outer walls 76 and 78.

The foot member 70 of the skirt 66 extends between a first end 96 and a second end 98. The first end 96 of the foot member 70 is attached to the lower end 86 of the leg member 68. The foot member 70 includes a generally planar inner wall 100 that extends from a generally linear inner edge 102 to a generally linear outer edge 104. The inner edge 102 is attached to the inner wall 88 of the lower portion 84 of the leg member 68 at the lower end 86. The outer edge 104 is generally parallel to the inner edge 102. The foot member 70 also includes a generally planar outer wall 106 that extends between a generally linear inner edge 108 and a generally linear outer edge 110 that is generally parallel to the inner edge 108. The inner edge 108 of the outer wall 106 is attached to the outer wall 90 of the lower portion 84 of the leg member 68 at the lower end 86. An end wall 112 extends generally transversely between the outer edge 104 of the inner wall 100 and the outer edge 110 of the outer wall 106. The inner wall 100 and the outer wall 106 are generally parallel to one another.

Figure 2:
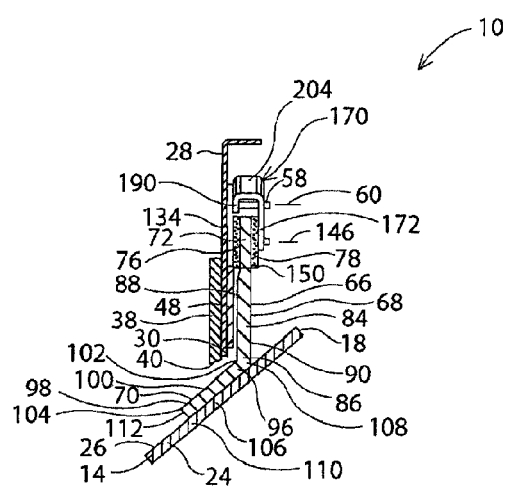
FIG. 2 is a cross-sectional view taken along line 2-2 of FIG. 1.
Figure 3:
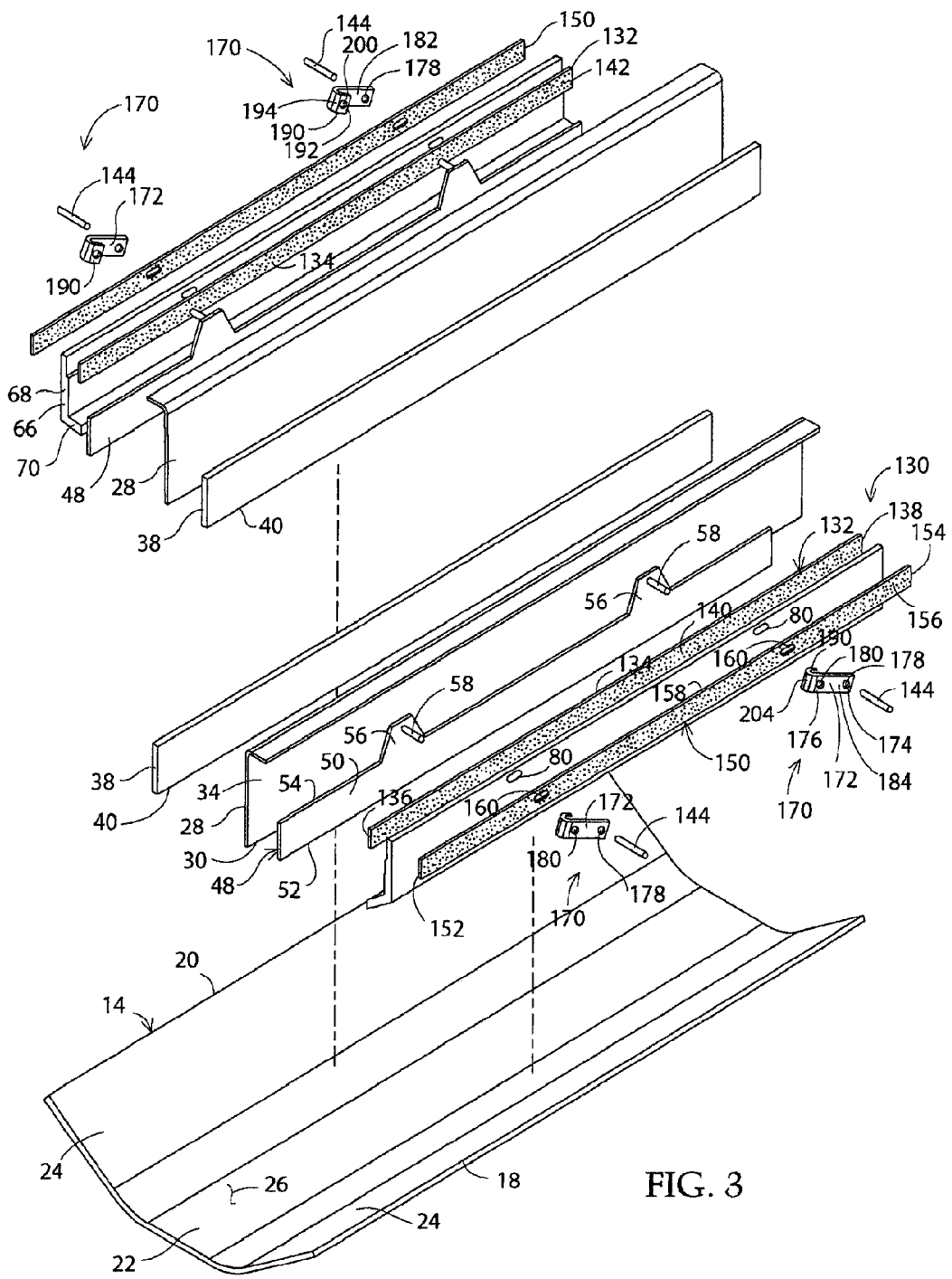
FIG. 3 is an exploded view of the conveyor mechanism and conveyor belt skirt assembly of FIG. 1.

As shown in FIG. 2 the foot member 70 is disposed at an inclined obtuse angle with respect to the lower portion 84 of the leg member 68 such that the skirt 66 is generally L-shaped. The outer wall 106 of the foot member 70 is adapted to be placed in engagement with the load carrying surface 26 of the conveyor belt 14 along the entire width of the outer wall 106 between the inner edge 108 and outer edge 110. The skirt 66 extends longitudinally between a first end 116 and a second end 118. The skirt 66 may be formed from a resilient elastomeric material, such as urethane.

The skirt assembly 10 also includes a mounting mechanism 130. The mounting mechanism 130 includes a mounting member 132 having an elongate plate-like strip member 134 that extends between a first end 136 and a second end 138. The strip member 134 includes a generally planar first surface 140 and a parallel generally planar second surface 142. The mounting member 132 also includes two or more fasteners 144, such as lynch pins, that are attached to the first surface 140 of the strip member 134 and that extend outwardly generally perpendicular to the strip member 134. Each fastener 144 includes a generally cylindrical shaft. The first end of the shaft is attached to the strip member 134 and the second end of the shaft includes a diametrical bore adapted to removably receive a retainer member, such as a cotter pin or the like. The fasteners 144 are spaced apart from one another the same distance that the fasteners 58 of the backing member 48 are spaced apart from one another. Each fastener 144 includes a generally linear central axis 146. The strip member 134 of the mounting member 132 is adapted to be located in the pocket formed by the upper portion 72 of the leg member 68 of the skirt 66 such that the first surface 140 of the strip member 134 is located adjacent to and in engagement with the inner wall 76 of the upper portion 72 of the leg member 68. Each fastener 144 of the mounting member 132 extends through a respective aperture 80 in the upper portion 72 of the leg member 68.

The mounting mechanism 130 also includes a clamping member 150 in the form of a generally plate-like strip member. The clamping member 150 extends between a first end 152 and a second end 154. The clamping member 150 includes a generally planar first surface 156 and a spaced apart and generally parallel planar second surface 158. The clamping member 150 includes two or more apertures 160, such as elongated slots, that extend between the first and second surfaces 156 and 158. The apertures 160 are spaced apart from one another the same distance that the fasteners 144 of the mounting member 132 are spaced apart from one another. The second surface 158 of the clamping member 150 is adapted to be located adjacent the outer wall 78 of the upper portion 72 of the skirt 66 with the fasteners 144 of the mounting member 132 extending through respective apertures 160. The upper portion 72 of the leg member 68 of the skirt 66 is thereby located between the strip member 134 of the mounting member 132 and the clamping member 150. A retainer member is removably attached to the second end of the fastener 144 to removably retain the skirt 66 and clamping member 150 to the mounting member 132. The strip member 134 of the mounting member 132 and the clamping member 150 extend generally the entire length of the upper portion 72 of the skirt 66 between the first and second ends 116 and 118 of the skirt 66.

The mounting mechanism 130 also includes two or more brackets 170. Each bracket 170 is generally J-shaped and includes a plate-like arm 172 having a first end 174 and a second end 176. The first end 174 of the arm 172 includes an aperture 178 adapted to receive a fastener 144 of the mounting member 132. The second end 176 of the arm 172 includes an aperture 180 adapted to receive a fastener 58 of the backing member 48. The arm 172 includes a generally planar interior surface 182 and a generally parallel planar exterior surface 184.

The bracket 170 also includes a generally plate-like finger 190 having a first end 192 and a second end 194. The finger 190 includes a generally planar interior surface 196 and a generally planar exterior surface 198. The finger 190 includes an aperture 200 coaxially aligned with the aperture 180 of the arm 172 and that is adapted to receive a fastener 58 of the backing member 48. The finger 190 is spaced apart from and generally parallel to the arm 172, with the second end 194 of the finger 190 being located transversely across from the second end 176 of the arm 172. The length of the finger 190 between the first end 192 and the second end 194 is substantially shorter than the length of the arm 172 between the first end 174 and second end 176. A connector member 204 extends between and attaches the second end 194 of the finger 190 to the second end 176 of the arm 172.

The bracket 170 is pivotally attached to the backing member 48 by inserting the fastener 58 through the aperture 200 in the finger 190 and through the aperture 180 in the second end 176 of the arm 172. The bracket 170 is pivotal about the axis 60 with respect to the backing member 48. The bracket 170 is also pivotally attached to the upper portion 72 of the skirt 66 by inserting the fastener 144 of the mounting member 132 through the aperture 80 in the upper portion 72 of the skirt 66, the aperture 160 in the clamping member 150, and the aperture 178 in the first end 174 of the arm 172. The bracket 170 is pivotal with respect to the skirt 66, mounting member 132 and clamping member 150 about the axis 146. As shown in FIG. 2, the exterior surface 198 of the finger 190 of the bracket 170 is adapted to engage the outer surface of the backing member 48 thereby selectively positioning the arm 172 and leg member 68 of the skirt 66 at a desired transverse location with respect to the plate member 50 of the backing member 48 and the side wall 28. The upper portion 72 of the leg member 68 is located transversely between a plane containing the interior surface 196 of the finger 190 and a plane containing the interior surface 182 of the arm 172. The lower portion 84 of the leg member 68 is located transversely between a plane containing the exterior surface 198 of the finger 190 and a plane containing the interior surface 182 of the arm 172.

As shown in FIG. 2, the foot member 70 is attached to the leg member 68 of the skirt 66 at an obtuse angle and is generally parallel to the angle of inclination of the inclined edge section 24 of the conveyor belt 14. The outer wall 106 of the foot member 70 is adapted to engage the load carrying surface 26 of the conveyor belt 14 along its entire width between the inner edge 108 and outer edge 110. The foot member 70 also extends from the lower end 86 of the lower portion 84 of the leg member 68 through the gap between the conveyor belt load carrying surface 26 and the bottom edges of the side wall 28, wear liner 38 and backing member 48 into the load zone of the conveyor mechanism 12.

In operation, conveyed material in the load zone of the conveyor mechanism 12 is in contact with the inner wall 100 of the foot member 70 and will press the outer wall 106 of the foot member 70 into engagement with the load carrying surface 26 of the conveyor belt 14. A seal is thereby created between the foot member 70 and the surface 26 of the conveyor belt 14 that inhibits the passage of conveyed material between the outer wall 106 of the foot member 70 and the surface 26 of the conveyor belt 14 such that the conveyed material remains in the load zone and does not pass through the gap and spill over the edge 18 of the conveyor belt 14. The skirt 66 seals the gap between the surface 26 of the conveyor belt 14 and the bottom edges of the side wall 28, wear liner 38, and backing member 48 closed. The engagement of the foot member 70 with the conveyor belt 14 prevents or inhibits the lower portion 84 of the leg member 68 from deflecting outwardly in response to transverse forces applied to the skirt 66 by the conveyed material.

The width of the outer wall 106 of the foot member 70 between the inner edge 108 and outer edge 110 allows the conveyor belt 14 to mistrack a substantial sideways or transverse distance before the skirt 66 can fall off the conveyor belt 14 over a side edge of the conveyor belt 14. As shown in FIG. 2, the conveyor belt 14 would need to horizontally mistrack to the left a sufficient distance such that the first side edge 18 of the conveyor belt 14 would move beyond the outer edge 110 of the outer wall 106 of the foot member 70 before the skirt 66 would fall over the side edge 18. Because the skirt 66 is made from resiliently flexible material, the foot member 70 can deflect with respect to the leg member 68 to accommodate variations in the angle of inclination of the edge section 24 of the conveyor belt 14 to maintain full contact between the outer wall 106 of foot member 70 and the surface 26 of the conveyor belt 14 and to also accommodate sagging of the conveyor belt 14 between idler roller supports.

As shown in FIG. 1, the arms 172 of the brackets 170 are inclined from the fastener 58 downwardly and forwardly to the fastener 144. When the arms 172 are inclined downwardly and forwardly as shown in FIG. 1, and the conveyor belt 14 is moving forward in a direction as shown by the arrow in FIG. 1, the brackets 170 will allow the skirt 66 to pivot or float upwardly and downwardly in engagement with the surface 26 of the conveyor belt 14 to thereby maintain engagement of the outer wall 106 of the foot member 70 with the surface 26 of the conveyor belt 14 in response to undulations of the conveyor belt 14. If desired, the angle of inclination of the arms 172 can be reversed such that they extend downwardly and rearwardly from the fasteners 58. In this case the arms 172 will press the skirt 66 downwardly into engagement with the belt 14 when the belt 14 is moving in the direction of the arrow in FIG. 1. The thickness of the foot member 70 between the walls 100 and 106 is shorter than the height of the gap such that the foot member 70 has room to move vertically upwardly without engaging the side wall 28, wear liner 38 or backing member 48 thus allowing the skirt to relieve obstructions and automatically adjust for wear of the skirt. If desired, different types of skirts such as, for example, the skirts disclosed in U.S. Pat. Nos. 5,816,388, 5,913,404, 6,557,697 and 6,575,294 may be used in connection with the mounting mechanism 130, with the mounting mechanism 130 providing the same self-adjusting operational features in connection with these skirts.

Figure 4:
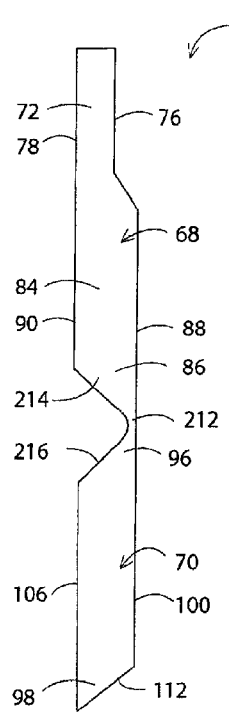
FIG. 4 is an end view of an alternate embodiment of the skirt.
Figure 5:
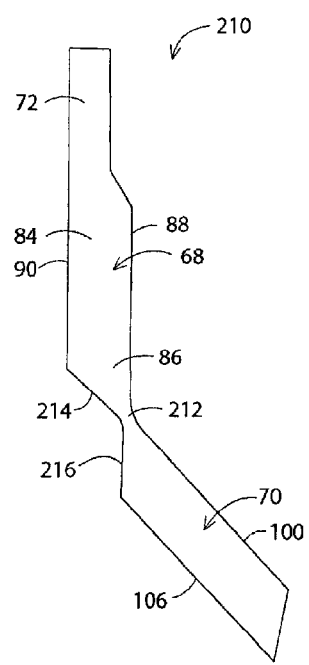
FIG. 5 is an end view of the skirt of FIG. 4 shown in a generally L-shaped configuration.

An alternate embodiment of the skirt 66 is shown in FIGS. 4 and 5 as skirt 210. The skirt 210 includes many of the same structural features as the skirt 66 and similar features are identified with the same reference number. The skirt 210 includes a hinge 212 that pivotally connects the lower end 86 of the leg member 68 to the first end 96 of the foot member 70. The lower portion 84 of the leg member 68 includes a generally planar bottom wall 214 that extends from the bottom edge of the outer wall 90 to the hinge 212. The bottom wall 214 is disposed at an inclined angle with respect to the outer wall 90, such as approximately forty-five degrees, although other angles may be used. The foot member 70 includes a generally planar top wall 216 that extends from the top edge of the outer wall 106 to the hinge 212. The top wall 216 is inclined at an angle with respect to the outer wall 106, such as approximately forty-five degrees, although other angles may be used. As shown in FIGS. 4 and 5, the hinge 212 is formed by a relatively thin section of resiliently flexible material between the inner walls 88 and 100 and the inner edges of the bottom and top walls 214 and 216.

As shown in FIG. 4, the foot member 70 is generally coplanar with and parallel to the leg member 68. Similarly, the inner wall 88 and inner wall 100 are generally coplanar and parallel to one another, and the outer wall 90 and outer wall 106 are generally coplanar and parallel to one another. The bottom wall 214 and top wall 216 form a generally V-shaped groove that extends the length of the skirt 210. The skirt 210 may be formed from a resilient elastomeric material, such as rubber. Rubber extrusions must often be flat or self-supporting until they are cured. The configuration of the skirt 210 as shown in FIG. 4 is therefore advantageous for use when the skirt 210 is extruded with a rubber material. The hinge 212 allows the foot member 70 of the skirt 210 to be pivoted with respect to the leg member 68, as shown in FIG. 5, at various different angles of inclination with respect to the leg member 68, such that the skirt 210 is generally L-shaped as shown in FIG. 5. The foot member 70 may therefore be pivoted with respect to the leg member 68 such that the outer wall 106 of the foot member 70 may fully engage the surface of the side edge 18 or 20 of the conveyor belt 14. The skirt 210 operates in the same manner as the skirt 66.

Figure 7:
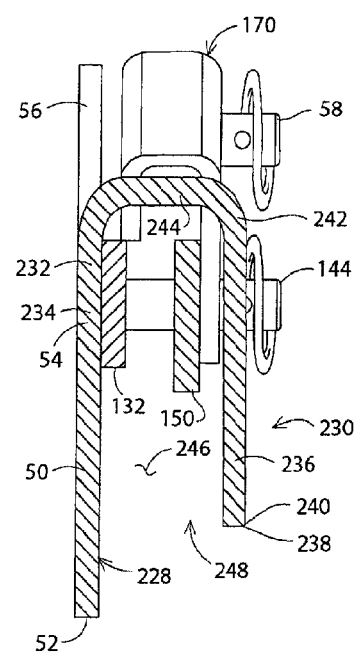
FIG. 7 is a cross sectional view taken along line 7-7 of FIG. 6.
Figure 6:
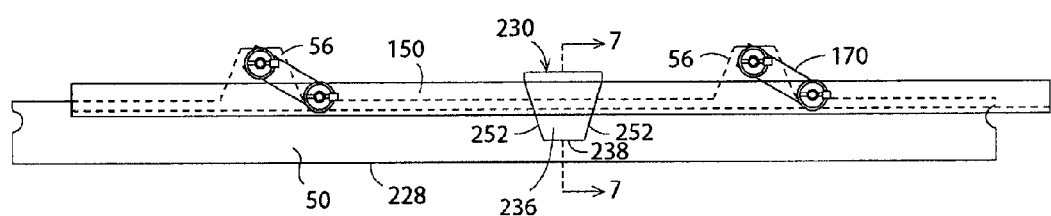
FIG. 6 is a side elevational view of the mounting mechanism and of the backing member with a retention bracket.
Figure 8:
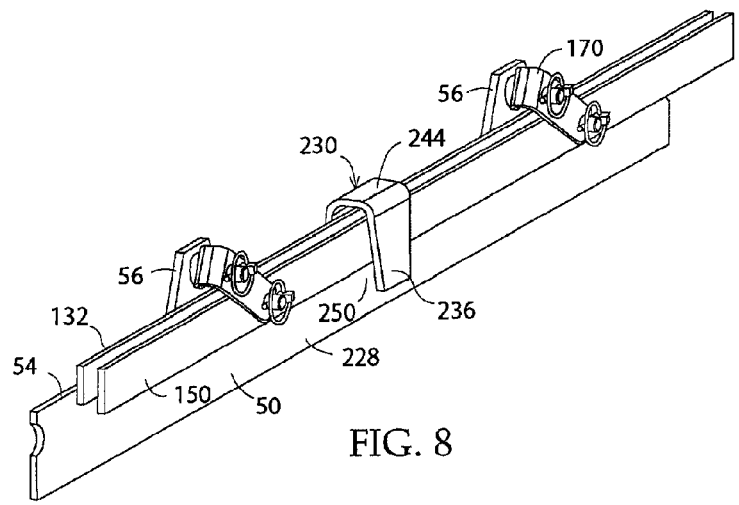
FIG. 8 is a perspective view of the mounting mechanism and backing member of FIG. 6.

FIG. 6-8 show an alternate embodiment of the backing member 48 as backing member 228 in connection with the mounting mechanism 130. The backing member 228 is constructed substantially similar to the backing member 48 and similar structural features are identified with the same reference number. The backing member 228 includes one or more inverted generally U-shaped retention brackets 230. The retention bracket 230 includes a plate-like connector member 232 having a bottom end 234 that is adapted to be connected to the upper edge 54 of the plate member 50 of the backing member 228, such that the connector member 232 is generally coplanar with the plate member 50. The connector member 232 may be integrally formed with the plate member 50 or may be attached thereto by welding, fasteners or the like. If desired, the retention bracket 230 may be separate from the backing member 228 such that the connector member 232 may be connected to the exterior surface 34 of the side wall 28, or other stationary structures by welding, fasteners or the like.

The connector member 232 also includes a stop member 236 such a generally planar and plate-like member. The stop member 236 extends from a tip 238 at a bottom end 240 to a top end 242. The stop member 236 is generally parallel to and spaced apart from the connector member 232 and the plate member 50 of the backing member 228. A spacing member 244 extends between and connects the top end 242 of the stop member 236 to the top end of connector member 232. The spacing member 244 is generally planar and plate-like and is generally perpendicular to the connector member 232 and stop member 236. A channel 246 is formed between the stop member 236 and the connector member 232 and plate member 50. The channel 246 includes an opening 248 between the tip 238 of the stop member 236 and the connector member 232 and plate member 50. The channel 246 also includes a side opening 250 between each side 252 of the stop member 236 and the connector member 232 and plate member 50. As shown in FIG. 7, the channel 246 is adapted to receive the mounting member 132 and clamping member 150 of the mounting mechanism 130 between the stop member 256 and the connector member 232 and plate member 50. The mounting member 132 and clamping member 150 extend through the channel 246 through the respective side openings 250. Although not shown in FIGS. 6-8, the leg member 68 of the skirt 66 or 210 would also be located within the channel 246.

In some installations, the skirt assembly 10 may be subjected to extreme outward side pressure from the conveyed material which would attempt to move the skirt 66 transversely away from the side wall 28 and backing member 228. In such situations, the stop member 236 of the retention bracket 230 will engage the clamping member 150 to prevent transverse movement of the clamping member 150 and also the skirt 66 outwardly away from the backing member 228 and side wall 28 beyond a selected distance. While the retention bracket 230 will resist side pressure applied to the skirt 66 and transverse movement of the skirt 66, the retention bracket 230 will allow the skirt 66, mounting member 132 and clamping member 150 to float vertically upwardly and downwardly within the channel 246. One or more retention brackets 230 may be located between adjacent ears 56 of the backing member 228, and may also be located outwardly from each ear 56.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A skirt adapted to be attached to a side wall of a conveyor mechanism to retain conveyed material on a conveyor belt of the conveyor mechanism, said skirt comprising:
   a leg member including an upper portion having an upper end and a lower portion having a lower end, said upper portion including a first inner wall and a first outer wall, said lower portion including a second inner wall and a second outer wall; and
   a foot member extending between a first end and a second end and having an inner wall and an outer wall, said first end attached to said lower end of said leg member, said foot member being disposed at an angle with respect to said lower portion of said leg member;
   whereby said foot member is adapted to extend into a gap formed between the side wall of the conveyor mechanism and the conveyor belt to retain conveyed material on the conveyor belt and said outer wall of said foot member is adapted to engage the conveyor belt; and
   wherein said first and second inner walls and said first and second outer walls of said leg member are each generally planar, and said inner wall and said outer wall of said foot member are each generally planar.

2. A skirt adapted to be attached to a side wall of a conveyor mechanism to retain conveyed material on a conveyor belt of the conveyor mechanism, said skirt comprising:
   a leg member including an upper portion having an upper end and a lower portion having a lower end, said upper portion including a first inner wall and a first outer wall, said lower portion including a second inner wall and a second outer wall;
   a foot member extending between a first end and a second end, said first end attached to said lower end of said leg member, said foot member being disposed at an angle with respect to said lower portion of said leg member;
   a hinge attaching said foot member to said leg member, said hinge adapted to allow said foot member to pivot with respect to said leg member; and
   whereby said foot member is adapted to extend into a gap formed between the side wall of the conveyor mechanism and the conveyor belt to retain conveyed material on the conveyor belt.

3. A conveyor belt skirt assembly adapted to be attached to a side wall of a conveyor mechanism to retain conveyed material on a conveyor belt of the conveyor mechanism, said conveyor belt skirt assembly comprising:
   a skirt including a leg member and a foot member, said leg member having an upper portion and a lower portion, said upper portion having an upper end, a first inner wall and a first outer wall, said lower portion including a lower end, a second inner wall and a second outer wall, said foot member extending between a first end and a second end, said first end of said foot member attached to said lower end of said leg member, said foot member being disposed at an angle with respect to said lower portion of said leg member;

a mounting member coupled to said upper portion of said leg member of said skirt; and an arm having a first end and a second end, said first end of said arm adapted to be pivotally connected to said mounting member, said second end of said arm adapted to be pivotally connected to the conveyor mechanism;

a retention bracket having a stop member forming a channel, said leg member of said skirt adapted to be located in said channel, said stop member adapted to limit transverse movement of said skirt whereby said foot member is adapted to extend into a gap formed between the side wall of the conveyor mechanism and the conveyor belt to retain conveyed material on the conveyor belt.

4. The conveyor belt skirt assembly of claim 3 including a backing member having a plate member, said retention bracket attached to said plate member.

5. A conveyor belt skirt assembly adapted to be attached to a side wall of a conveyor mechanism to retain conveyed material on a conveyor belt of the conveyor mechanism, said conveyor belt skirt assembly comprising:

a skirt including a leg member having an upper portion and a lower portion, said upper portion having an upper end, a first inner wall and a first outer wall, said lower portion including a lower end, a second inner wall and a second outer wall;

a mounting member coupled to said upper portion of said leg member of said skirt;

a bracket including an arm having a first end and a second end, and a finger attached to said second end of said arm, said first end of said arm adapted to be pivotally connected to said mounting member, said second end of said arm adapted to be pivotally connected to the conveyor mechanism, said finger adapted to be located between said second end of said arm and the conveyor mechanism such that said finger spaces said arm from the conveyor mechanism to thereby position said skirt with respect to said conveyor mechanism.

6. The conveyor belt skirt assembly of claim 5 wherein said finger is spaced apart from and generally parallel to said arm, said finger being attached to said second end of said arm by a connector member.

7. The conveyor belt skirt assembly of claim 5 wherein said second end of said arm includes a first aperture and said finger includes a second aperture, said first and second apertures being coaxially aligned with one another.

8. The conveyor belt skirt assembly of claim 7 including a fastener adapted to attach said second end of said arm to the conveyor mechanism, said first aperture of said arm and said second aperture of said finger adapted to receive said fastener.

9. The conveyor belt skirt assembly of claim 5 wherein said finger of said bracket includes an outer wall located in a first plane and said arm of said bracket includes an inner wall located in a second plane, said leg member of said skirt being located between said first plane and said second plane.

10. The conveyor belt skirt assembly of claim 5 wherein said skirt includes a foot member attached to said lower end of said lower portion of said leg member, said foot being disposed at angle with respect to said leg member.

* * * * *